United States Patent
Schelhaas et al.

(10) Patent No.: US 9,890,879 B2
(45) Date of Patent: Feb. 13, 2018

(54) HOSE ANTI-COLLAPSE RIBS, SYSTEMS AND METHODS

(75) Inventors: Douglas D. Schelhaas, Aurora, CO (US); Donald R. Gilbreath, Castle Rock, CO (US); Tim Saupe, Parker, CO (US)

(73) Assignee: Gates Corporation, Denver, CO (US)

( * ) Notice: Subject to any disclaimer, the term of this patent is extended or adjusted under 35 U.S.C. 154(b) by 2106 days.

(21) Appl. No.: 12/380,212

(22) Filed: Feb. 25, 2009

(65) Prior Publication Data

US 2009/0229697 A1   Sep. 17, 2009

Related U.S. Application Data

(63) Continuation-in-part of application No. 12/072,343, filed on Feb. 26, 2008.

(51) Int. Cl.
| | | |
|---|---|---|
| *F16L 11/10* | (2006.01) | |
| *F16L 33/213* | (2006.01) | |
| *F02M 35/12* | (2006.01) | |
| *F02M 35/10* | (2006.01) | |

(52) U.S. Cl.
CPC ........ *F16L 11/10* (2013.01); *F02M 35/10091* (2013.01); *F02M 35/1277* (2013.01); *F16L 33/213* (2013.01); *Y10T 29/49* (2015.01)

(58) Field of Classification Search
CPC .............................. F16L 11/10; F16L 33/213
USPC .......... 138/98, 110, 112, 167, 168, 169, 170
See application file for complete search history.

(56) References Cited

U.S. PATENT DOCUMENTS

| | | | | |
|---|---|---|---|---|
| 4,346,922 A | * | 8/1982 | Ohtsuga et al. | 285/109 |
| 4,478,437 A | * | 10/1984 | Skinner | 285/189 |
| 4,564,201 A | | 1/1986 | Hannah | 277/1 |
| 5,096,332 A | | 3/1992 | Kawafuji | |
| 5,119,862 A | * | 6/1992 | Maimets et al. | 138/98 |
| 5,167,818 A | | 12/1992 | Baert et al. | 210/321.87 |
| 5,333,360 A | * | 8/1994 | Oetiker | 24/20 R |

(Continued)

OTHER PUBLICATIONS

"Smogthemog" S6 AAN Intake Hose Anti-Collapse Rings Internet Article, Nov. 3, 2007, http://www.rs246.com/index.php?name=PNpbpBB2&file=printview&t=65639&start=0>.

(Continued)

*Primary Examiner* — Ryan A Reis
(74) *Attorney, Agent, or Firm* — Paul N. Dunlap, Esq.; Jeffrey A. Thurnau, Esq.

(57) ABSTRACT

An integral hose anti-collapse rib comprises a unitary body having a first cantilevered portion curved in a first direction. This first cantilevered portion defines a first end. A second cantilevered portion is curved in a direction opposite the direction of the first cantilevered portion, in a direction facing the first cantilevered portion. The second cantilevered portion also defines a second end disposed at an opposite extent of the rib from the first end. The hose anti-collapse rib also comprises a locking mechanism that locks the first end of the rib to the second end of the rib, such that the first and second cantilevered portions together form a generally circular shape. Embodiments of locking mechanisms may include a button and orifice locking mechanism and/or a tab and channel locking mechanism. In a relaxed state in which the locking mechanism is not engaged, the rib preferably defines a non-circular, generally spiral shape.

15 Claims, 6 Drawing Sheets

(56) References Cited

U.S. PATENT DOCUMENTS

| | | | | |
|---|---|---|---|---|
| 5,507,500 | A | | 4/1996 | Skinner et al. .................. 277/9 |
| 6,138,718 | A | * | 10/2000 | Maimets ........................ 138/98 |
| 6,152,455 | A | * | 11/2000 | Brockway et al. ........... 277/576 |
| 6,953,194 | B2 | * | 10/2005 | Brockway ..................... 277/576 |
| 2005/0206164 | A1 | | 9/2005 | Brockway ..................... 285/420 |

OTHER PUBLICATIONS

Notification of Transmittal of the International Search Report and the Written Opinion of the International Searching Authority, or the Declaration, International Application No. PCT/US2009/001269 dated Jul. 14, 2009.

* cited by examiner

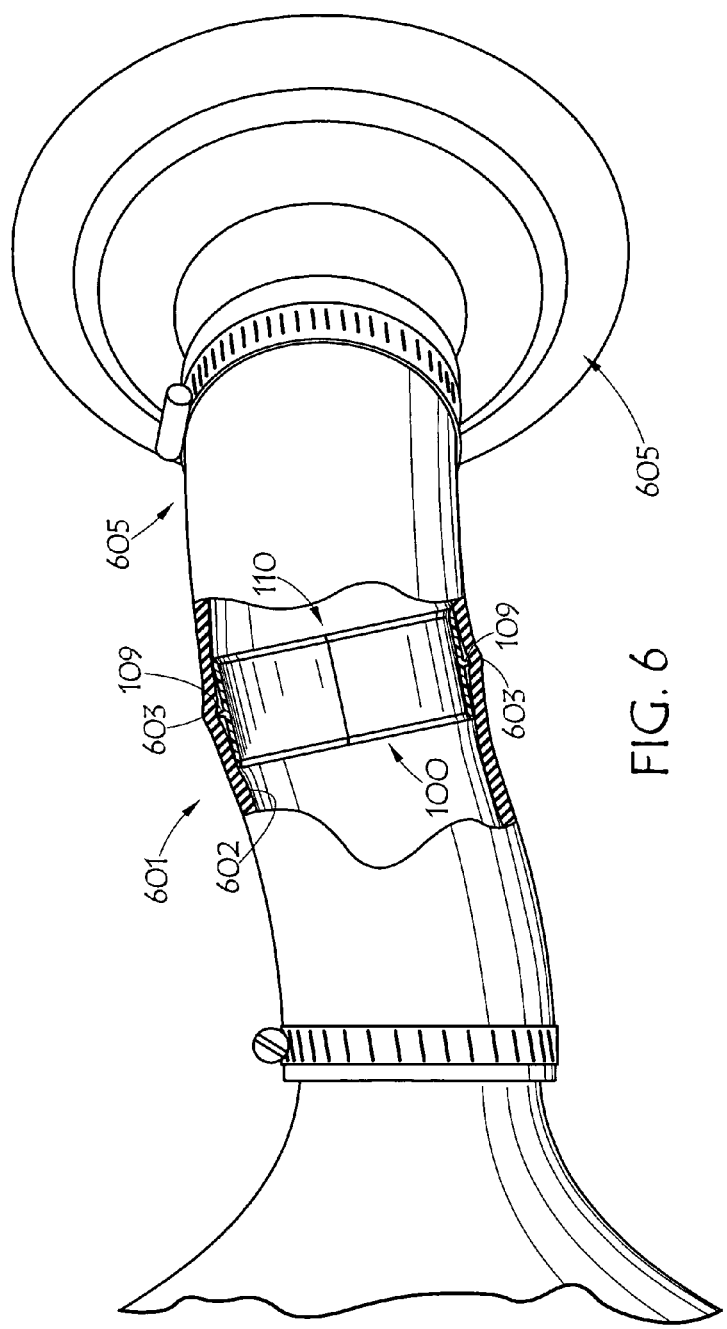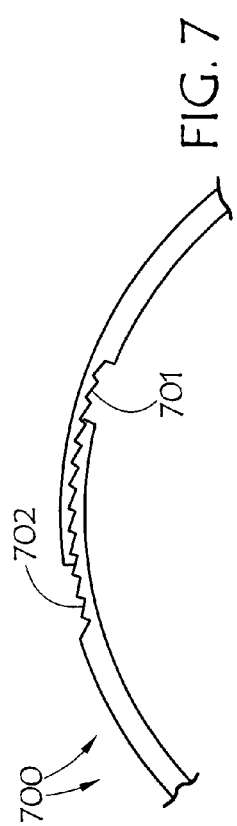

HOSE ANTI-COLLAPSE RIBS, SYSTEMS AND METHODS

CROSS-REFERENCE TO RELATED APPLICATIONS

This is a continuation-in-part of U.S. patent application Ser. No. 12/072,343, filed Feb. 26, 2008, entitled Hose Anti-collapse Ribs, Systems and Methods, which is hereby incorporated herein by reference.

BACKGROUND OF THE INVENTION

Field of the Invention

This invention relates generally to hoses, more particularly to hoses subject to vacuum, and specifically to hose anti-collapse rib systems and methods.

Description of the Prior Art

Turbocharger intake hoses and other applications that require vacuum resistance typically require thick walls, stiff materials, built-in springs, or internal springs to resist collapse. These solutions are expensive, difficult to install, and heavy. Because internal springs have a high surface area and have no interference fit with the hose, vibration and high air flow can cause them to move out of place, even into the engine, possibly even into the intake port. Even minimal spring movement can damage, or interfere with the operation of, engine control sensors. Regardless, movement of such a spring could result in hose collapse. Furthermore, built-in springs often require hand lay-up manufacturing. Disposition of springs within hose can cause discontinuities that may lead to premature hose failure. Such discontinuities might include: voids in hoses in which springs are molded-in; shear stress in the rubber of the hose due to the great difference in stiffness between the spring and the hose rubber; uneven loading of clamps due to an underlying spring; and/or vibration failures due to the spring wearing through the rubber of the hose.

SUMMARY

The present invention is directed to hose anti-collapse ribs, systems and methods which provide resistance to collapse in turbocharger intake hoses and other vacuum hose applications. In particular, embodiments of the present invention are directed to an internally disposed stiffening rib that expands and locks into place on the hose ID. This solution allows relatively inexpensive, thinner wall hose to be used in relatively higher vacuum applications. The rib may be made of relatively thin, low cost molded plastic. The material might be selected to be resistant to rusting, and resistant to other chemicals which could include ethylene glycol, re-circulated fuel, oil, etc. Advantageously, such ribs cause less flow restriction than a typical internal spring. Unlike springs, the ribs expand and preferably lock into the hose. The present ribs also have minimal cross-sectional area exposed to the flow stream within a hose, minimizing the force that the flowing fluid applies, further assuring that the rib will stay in place.

In accordance with embodiments of the present invention an integral hose anti-collapse rib might comprise a unitary body having a first cantilevered portion curved in a first direction. This first cantilevered portion defines a first end. A second cantilevered portion is curved in a second direction opposite the first direction of the first cantilevered portion, that is, in a direction facing or towards the first cantilevered portion. The second cantilevered portion also defines a second end disposed at an opposite extent of the rib from the first end. Such embodiments also preferably comprise a locking mechanism that locks the first end of the rib to the second end of the rib, such that the first and second cantilevered portions together form a generally circular shape. However, in a relaxed state in which the locking mechanism is not engaged, the rib preferably defines a non-circular, generally spiral shape.

The rib may also include one or more interference ridges defined in an exterior surface of the cantilevered portions. This ridge may, in certain embodiments be adapted to deform a hose in which the rib is disposed to provide an interference interlock between the rib and the hose when the rib is expanded within the hose. An interference ridge could consist of one or more interference projections of any shape adapted to engage the inner surface of the hose when the rib is expanded within the hose.

The locking mechanism might comprise complementary tabs defined by the ends, wherein each of the tabs is an end portion of the respective cantilevered portion having a thickness approximately one-half the thickness of the respective cantilevered portion. In such embodiments the tab defined by the first cantilevered portion may be generally aligned with an inner portion of the first cantilevered portion and the tab defined by the second cantilevered portion may be generally aligned with the outer portion of the second cantilevered portion. The tabs may comprise a leading edge defined by one of the cantilevered portions and a complementary leading edge receptive notch defined by the other of the rib's cantilevered portions.

In certain embodiments a locking ridge may be defined in an outside surface of one of the tabs in certain embodiments with a complementary groove, adapted to receive the locking ridge, defined in an inside surface of the other of the tabs. The groove may extend beyond the other tab along an inside surface of the respective cantilevered portion. The cooperative edge and notch lock the rib in the expanded position, possibly in conjunction with the cooperative locking ridge and groove.

In operation, a hose anti-collapse rib such as described above may be deployed by disposing the hose anti-collapse rib within a hose that is to be subject to vacuum or similar collapsive forces and expanding opposite curved cantilevered portions of the rib to form the rib into a generally circular shape in contact with an inner surface of the hose. This expanding may be accomplished in certain embodiments by indexing a ridge defined in an outer surface of one tab in a groove defined in an inner surface of the other tab. More specifically, the expanding may include sliding the ridge defined in the outside surface of the one tab in a groove defined in an inside surface of the other cantilevered portion, guiding the ridge into the groove defined in the inner surface of the other tab. Preferably the hose anti-collapse rib is locked in the generally circular shape. Such locking may, in accordance with certain embodiments of the present invention, include mating a first tab defined by an end of a first of the cantilevered portions with a second tab defined by an end of a second of the cantilevered portions. Movement of the rib within the hose may be prevented by engaging an interior surface of the hose with a ridge defined in an outer surface of the rib.

A method for forming such an anti-collapse rib might include molding a rib body having a first curved cantilevered portion and a second curved cantilevered portion. This molding might include forming tabs in ends of the cantilevered portions. The tab formed in the end of the first cantilevered portion may be formed to have approximately half the thickness of the remainder of the first cantilevered portion. Correspondingly, the tab formed in the end of the second cantilevered portion may be formed to have approximately half the thickness of the remainder of the second cantilevered portion.

Preferably, the second cantilevered portion has a curvature deflected in an opposite direction, toward the end of the first cantilevered portion. An end of the second cantilevered portion may be positioned under the first cantilevered portion such that the rib body forms a generally circular shape that can be expanded into a larger generally circular shape. Preferably the larger generally circular shape is more circular than the initial circular shape. Consistent with the above discussion, the ends of the rib body may lock in place upon expansion of the rib body in the larger generally more circular shape.

Another embodiment of a hose anti-collapse rib comprises the aforementioned first cantilevered portion curved in a first direction and defining a first end, as well as the second cantilevered portion curved with a different curvature than the first cantilevered portion and in a direction facing the first direction, defining a second end disposed at an opposite extent of the rib from the first end. However, this embodiment employs interlockable complementary tabs defined by the ends with a raised locking button defined by one of the tabs and a complementary button receptive orifice defined in the other of the tabs. The button may be received in the orifice, locking the first end to the second end such that the first and second cantilevered portions together form the above described generally circular shape. A groove or slot defined in a surface of the other of the tabs may be adapted to receive and guide the button into the orifice during expansion.

An embodiment of a method for deploying such a rib might again include disposing the hose anti-collapse rib within a hose subject to vacuum, expanding the opposite curved cantilevered portions of the rib to form the rib into the generally circular shape in contact with an inner surface of the hose, and indexing the raised button defined by one of the tabs in a button receptive orifice defined in the other of the tabs to lock the hose anti-collapse rib in the generally circular shape. The expansion of the rib might be facilitated by sliding the raised button in a slot defined in a surface of the other of the cantilevered portions, guiding the button into the orifice defined in the other tab.

Yet another embodiment of a hose anti-collapse rib might also include the first cantilevered portion curved in a first direction and defining a first end and the second cantilevered portion curved with a different curvature than the first cantilevered portion and in a direction facing the first direction, defining a second end disposed at an opposite extent of the rib from the first end. This embodiment might have complementary tabs defined by the ends, with a pair of raised edges defined along outside edges of a first of the tabs, defining a channel between the raised edges, while the other of the tabs has a complementary width fitting into the channel when the first end is locked to the second end to form a generally circular-shaped rib. The raised edges may extend beyond the first tab of the respective cantilevered portion.

An embodiment of a method for deploying this rib might again include disposing the rib within a hose subject to vacuum, expanding the opposite curved cantilevered portions of the rib to form the rib into a generally circular shape in contact with an inner surface of the hose, and indexing the raised edges defined along outside edges of one of the tabs with the other of the tabs, locking the hose anti-collapse rib in the generally circular shape. The narrower tab may be slid between the raised edges during expansion, guiding the narrow tab into the channel defined between the raised edges.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 6 is a fragmented environmental view showing an embodiment of the present hose anti-collapse rib disposed in a turbocharger intake hose; and FIG. 7 is a fragmented view of the locking mechanism of a ratchet embodiment of the present invention;

DETAILED DESCRIPTION

Figure 1:
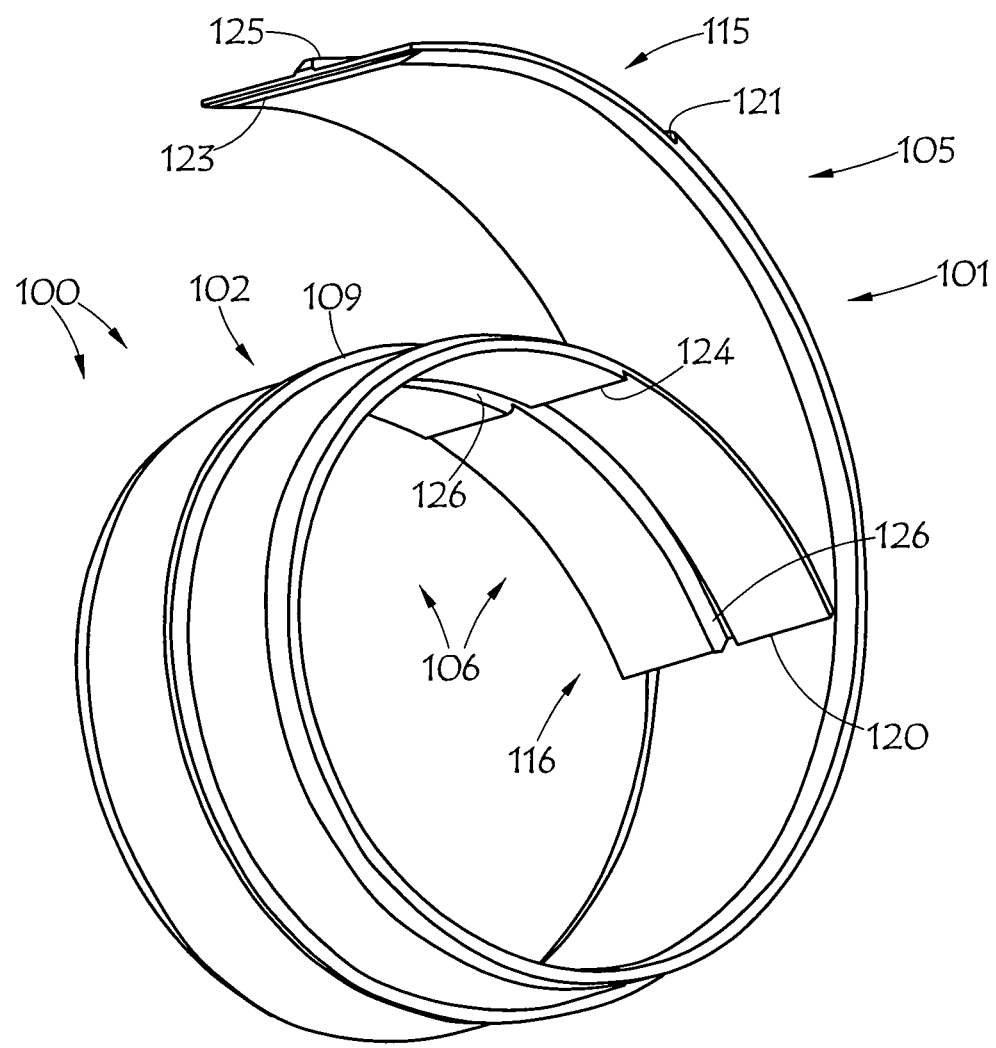
FIG. 1 is a perspective view of an embodiment of the present hose anti-collapse rib.
Figure 2:
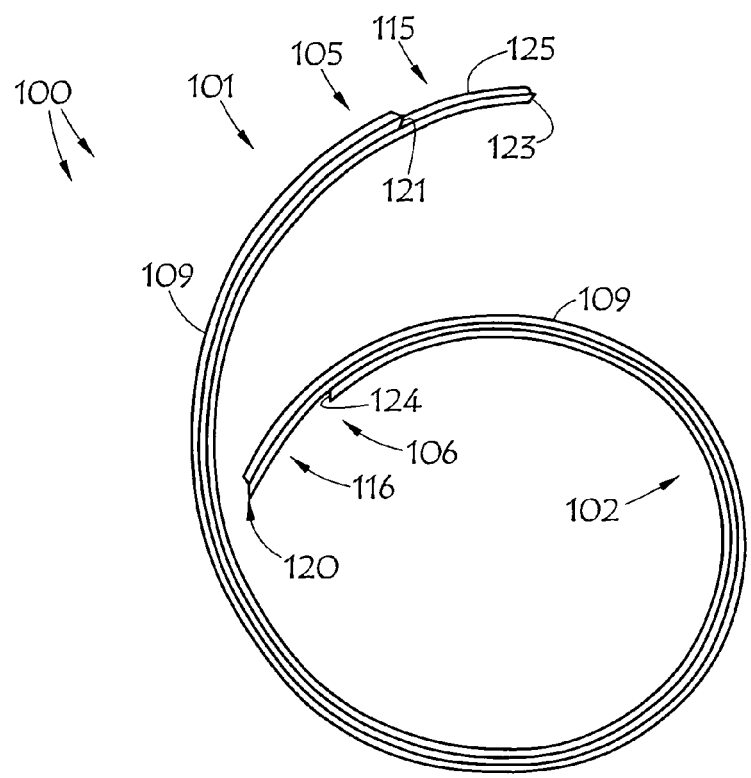
FIG. 2 is a front view of the embodiment of FIG. 1 with the rib disposed in a relaxed state.
Figure 3:
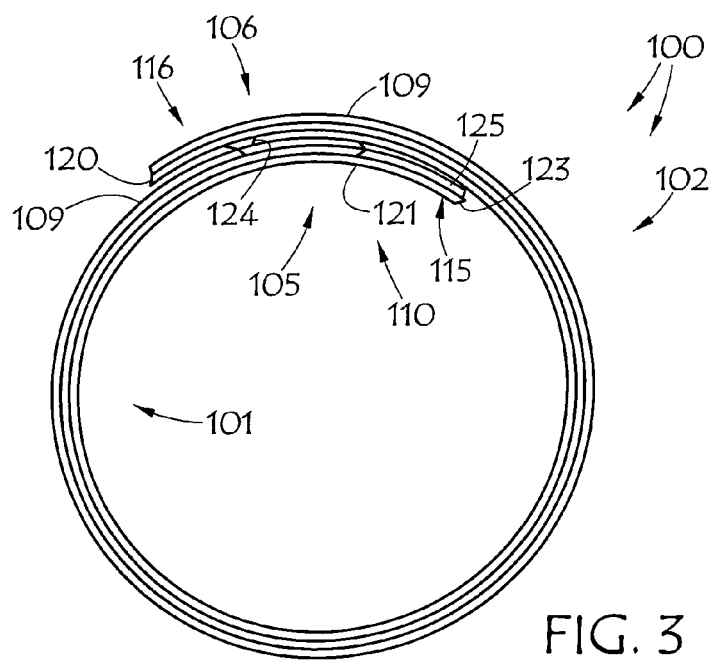
FIG. 3 is a front view of the embodiment of FIG. 1 with the rib disposed in a collapsed state, prepared for insertion in a hose.

Embodiments of present hose anti-collapse rib 100 preferably employ a dual cantilever limb configuration, where the rib is molded in the approximate shape of two integral limbs one with a curvature greater than the other, deflected or curved in opposite, facing directions. This provides a non-circular, somewhat spiral, rib, such as illustrated in FIGS. 1 and 2, having the general shape of a "6" or a "9". If first limb 101 is thereafter positioned under limb 102 the generally circular, spiral, collapsed ring configuration shown in FIG. 3 is obtained. Upon expansion of rib 100, the expanded and locked (more) circular shape shown in FIG. 4 is obtained.

In greater detail, the illustrated embodiment of an integral hose anti-collapse rib 100 might be a unitary body having a first cantilevered portion or limb 101. First limb 101 is preferably curved and defines a first end 105. A second cantilevered portion or limb 102 is preferably curved in a direction opposite the direction of the first cantilevered portion, as shown in FIGS. 1 through 4. As will be appreciated from FIGS. 1 and 2, first limb 101 preferably has less curvature (i.e. a larger radius) than second rib 102. Second limb portion 102 preferably also defines second end 106, which may be viewed as being disposed at an opposite extent of rib 100 from first end 105. Preferably, as may be best seen in FIG. 5, all edges of the rib are tapered or chamfered to keep the hose from being damaged during expansion of the rib or by the expanded rib itself. Taper 107 of internal edges of rib 100 preferably minimize flow disruption created by deployed rib 100.

The illustrated embodiment of rib 100 also includes hose interference ridge 109 extending outwardly from an exterior surface of rib 100. In certain embodiments, interference ridge 109 is adapted to deform a hose in which the rib is deployed to provide a heavy "interference interlock" between the rib and the hose. For example, with attention directed to environmental FIG. 6, when rib 100 is expanded within hose 601 (illustrated as a turbocharger intake hose), interference ridge 109 contacts inner surface 602 of hose 601, deforming it, as evidenced by external bulge 603 in hose 601. This contact between interference ridge 109 and inner hose surface 602 provides the aforementioned interference interlock, which prevents movement of rib 100 within hose 601, including bracing the rib to help prevent rotation of the rib within the hose or migration of the rib along the length of hose 601 (toward turbo charger 605). In particular, the interference interlock helps assure that under heat and pressure, the hose will not expand beyond the diameter of the rib and cause the rib to move out of place, such as toward the impeller of turbo charger 605. It will be appreciated that various embodiments of the present invention may employ more than one interference ridge extending outwardly from the exterior surface of the rib to enhance the above-described interference interlock. Likewise, an interference ridge could comprise one or more interference projections of any discrete shape, size, and/or arrangement or pattern adapted to engage the inner surface of the hose when the rib is expanded within the hose. Also, it should be appreciated that adhesive or some other method to attach the expanded rib to the interior of the hose wall can be used to ensure that the rib does not move within the hose.

Figure 4:
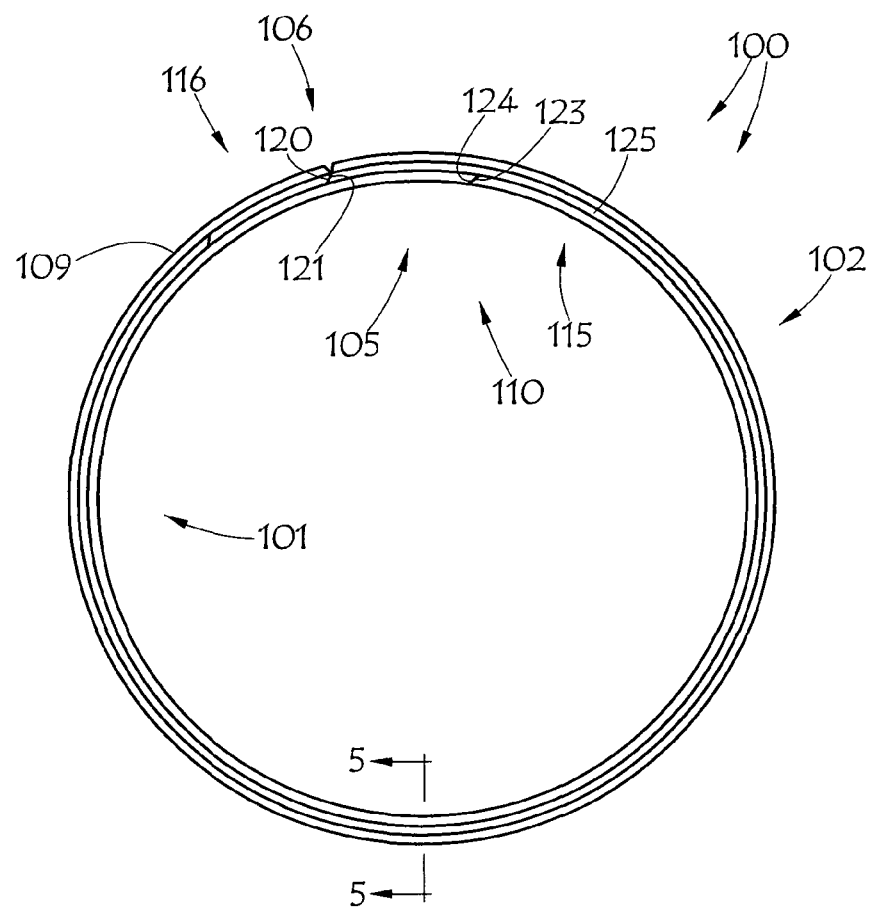
FIG. 4 is a front view of the embodiment of FIG. 1 with the rib expanded.
Figure 5:
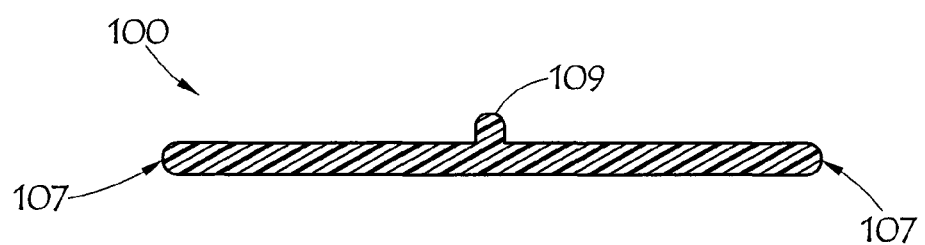
FIG. 5 is a fragmented, generally cross sectional view of the rib body, taken generally along line 5-5 of FIG. 4.

The illustrated embodiment of rib 100, also preferably includes locking mechanism 110 that locks first end 105 of rib 100 with second end 106 of rib 100, particular when rib 100 is disposed in the expanded configuration shown in FIGS. 4 and 6. Thereby, in the expanded and locked configuration best seen in FIG. 4, first and second cantilevered limb portions, 101 and 102, together form a generally circular shape. However, in a relaxed state in which locking mechanism 110 is not engaged, rib 100 preferably defines the generally spiral shape seen in FIG. 3.

Locking mechanism 110 might comprise complementary tabs 115 and 116 defined by ends 105 and 106, respectively. Each of tabs 115 and 116 are an end portion of the respective cantilevered limb portion 101 or 102. Preferably each tab has a thickness that is approximately one-half the thickness of the rest of rib 100. In the illustrated embodiment the tabs each comprise a leading portion of the respective cantilevered limb and are complementary, when disposed in the loading configuration shown in FIG. 3 or the deployed configuration shown in FIGS. 4 and 6. Thus, a leading portion of limb 101 defines receptive tab 115, adapted to receive opposite tab 116 upon expansion of rib 100. In the illustrated embodiment, tab 115, defined by first cantilevered portion 101, might be generally aligned along an inner thickness or surface of the first cantilevered portion. Complementarily tab 116, defined by second cantilevered portion 102, might be generally aligned with an outer thickness or surface of the second cantilevered portion.

Illustrated locking mechanism 110 further employs edge 120, defined by the leading edge of second limb 102 and receptive notch 121 defined at the base of tab 115 in first limb 101. Further, illustrated locking mechanism 110 may also employ edge 123, defined by the leading edge of first limb 101 and receptive notch 124 defined at the base of tab 116. In the expanded configuration shown in FIGS. 4 and 6, leading edges 120 and 123 are disposed in respective receptive notches 121 and 124 to lock rib 100 in the generally circular expanded state.

Illustrated locking mechanism 110 also employs alternative locking ridge 125 extending outwardly from an outside surface of tab 115 and complementary groove 126 (best seen in FIG. 1) defined in an inner surface of tab 116, which is adapted to receive locking ridge 125. Groove 126 may (discontinuously) extend beyond notch 124 of tab 116, along an inside surface of cantilevered limb portion 102 to act as a guide for locking ridge 125 during expansion of rib 100 from the spiral condition shown in FIG. 3 to the expanded state of FIGS. 4 and 6. This guiding might also aid in alignment of rib portion 101 with rib portion 102 during deployment. Once deployed, locking ridge 125's indexing with groove 126 helps prevent lateral slippage of tabs 115 and 116, further ensuring the integrity of expanded rib 100. Also, in the expanded position, locking ridge 125 might add support to the portion of interference ridge 109 that extends onto the surface of tab 102 by filling in groove 126.

A method for forming illustrated anti-collapse rib 100 might include molding a one-piece rib body having integral first and second curved cantilevered limb portions 101 and 102. This molding might include forming tabs 115 and 116 at the ends of cantilevered limb portions 101 and 102. Consistent with the description above, tab 115 formed in the end of the first cantilevered portion 101 might be formed to have approximately half the thickness of the remainder of the first cantilevered portion. Correspondingly, tab 116 formed in the end of second cantilevered portion 102 may be formed to have approximately half the thickness of the remainder of the second cantilevered portion. As also described above, second cantilevered portion 102 preferably has a tighter curvature than first cantilevered portion 101, deflected or curved in an opposite direction, toward the end of the first cantilevered limb portion. Following initial forming or manufacture, rib 100 has the initial "6" shape shown in FIGS. 1 and 2. As described in greater detail below, the end of first cantilevered portion 101 may be positioned under the second cantilevered portion 102 such that the rib body forms a generally circular, spiral shape that can be expanded into a larger generally circular shape. Preferably the larger generally circular shape is more circular than the spiral shape. In other embodiments, the deployed or expanded generally circularly shape may be more oval or the like in order to fit within a hose of generally oval shape or other shape that is not precisely circular.

Hose anti-collapse rib 100 described above may be deployed generally by following the configurations illustrated in FIGS. 2 through 4. A rib having the general manufactured shape shown in FIGS. 1 and 2 may be deflected into the general spiral shape shown in FIG. 3 by passing first limb portion 101 under second rib portion 102, or conversely passing second limb portion 102 over first rib portion 101, such as by deflecting one or both rib portion laterally. As a result, rib limb 101 is "loaded" against limb 102. Hose anti-collapse rib 100, in the spiral-shaped configuration of FIG. 2, may be disposed within a hose that is to be subject to vacuum or similar collapsive forces, such as turbocharger intake hose 601. Then rib 100 may be expanded into the configurations shown in FIGS. 4 and 5 by expanding oppositely curved cantilevered limb portions 101 and 102 to form the rib into a generally circular shape that preferably contacts inner surface 602 of hose 601. This expanding may be accomplished, or facilitated in some embodiments, such as those illustrated, by indexing locking ridge 125 defined in an outer surface of tab 101 in groove 126 defined in an inner surface of tab 116 and limb portion 102. More specifically, the expanding may include sliding locking ridge 125 in the portion of groove 126 defined in the inner surface of limb 102, guiding locking ridge 125 into the portion of groove 126 defined in the inner surface of tab 106. Regardless, the loading of limb 101 against limb 102 will facilitate locking tabs 115 and 116 together. Preferably, hose anti-collapse rib 100 is thus disposed in a generally circular shape and may be locked into this shape, at least in the illustrated embodiments, by mating edge 120 of second tab 116 with notch 121 defined at the base of first tab 115, and the indexing of locking ridge 125 with groove 126. Thus deployed, movement of rib 100 within hose 601 will be arrested in various embodiments, such as the illustrated embodiment, by engaging interior surface 603 of hose 601 with interference ridge 109, defined in the outer surface of rib 100.

As can be appreciated, the locking mechanisms described are only illustrative. Various embodiments of the present invention might not employ the locking ridge and groove. Other example embodiments might employ additional locking structures that might include bonding the tabs together after installation by means such as adhesive or ultrasonic welding. Such bonding might be employed in the place of, or in addition to, the interlocking provided by the illustrated edge/notch and/or locking ridge/groove locking mechanisms, or the like. Other embodiments of the present invention might employ an external ring, corresponding to the rib, such that the hose wall is deformed between the external ring and the internal rib to aid in keeping the rib locked in place.

The embodiment of the present invention illustrated in FIGS. 1 through 6 utilizes tabs with leading edges that lock into notches at a designated rib diameter, resulting in a constant thickness rib. However, ratcheting rib embodiments, such as rib 700 of FIG. 7, that could deploy or open to multiple diameters, may also be an attractive option. Such a ratcheting design could possibly be spring-loaded, such as by forming the limb portions with an outwardly expanding bias, to automatically expand into place once positioned in the hose. In such a ratchet embodiment "dogs" 701 might be defined on a surface of one tab and "pawls" 702 might be defined on the facing surface of the other tab, such that the dogs and pawls engage in a one-way, locking fashion. If such an embodiment is spring loaded, as the hose in which the rib is disposed expands, due to temperature or fatigue, the rib would ratchet outward, tighter.

Figure 8:
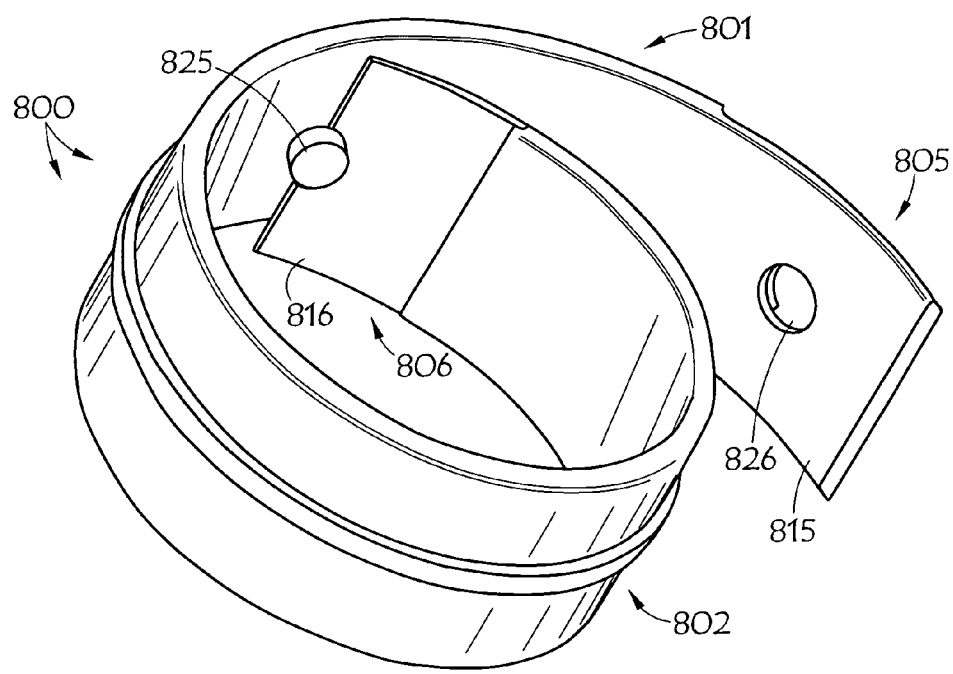
FIG. 8 is a perspective view of an embodiment of the present hose anti-collapse rib having a button-and-orifice locking mechanism.
Figure 9:
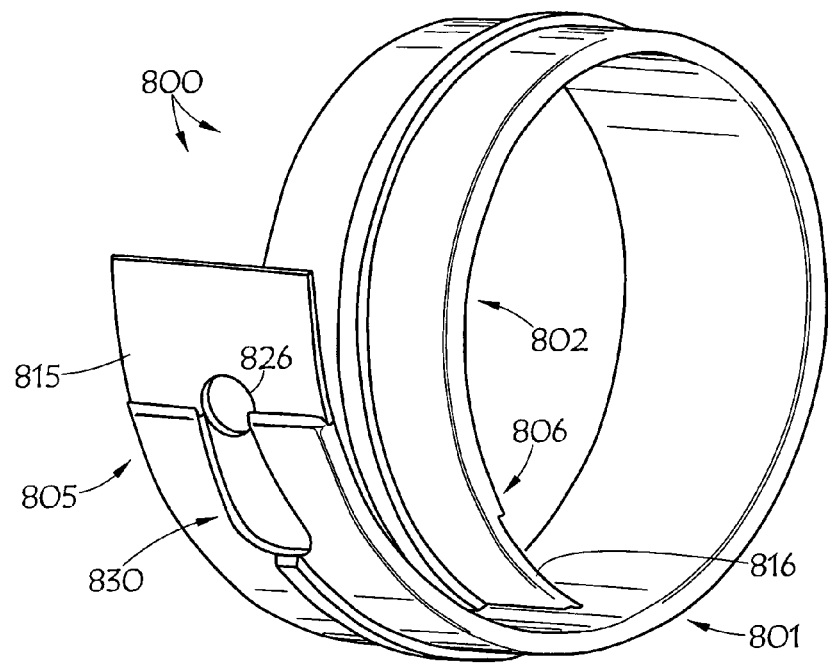
FIG. 9 is another perspective view of the embodiment of FIG. 8.

FIG. 8 shows a perspective view of embodiment 800 of the present hose anti-collapse rib that employs a button-and-orifice locking mechanism. FIG. 9 is another perspective view of button-and-orifice locking mechanism embodiment 800. This embodiment of hose anti-collapse rib 800 comprises first cantilevered portion or limb 801 curved in a first direction and defining first end 805 and second cantilevered portion or limb 802 curved with a different curvature than the first cantilevered portion and in a direction facing the first direction. Second limb 802 defines second end 806 disposed at an opposite extent of rib 800 from first end 805. Rib 800 employs interlockable complementary tabs 815 and 816 defined by ends 805 and 806, respectively. Raised locking button 825 is defined by one of the tabs (tab 816 in FIGS. 8 and 9.) Complementary button receptive orifice 826 is defined in the other of the tabs (tab 815 in FIGS. 8 and 9). Button 825 may be received in orifice 826, locking first end 805 to second end 806 such that first and second cantilevered portions 801 and 802 form the a generally circular shape (similar to as depicted in FIG. 4 above). Slot 830 defined in a surface of the tab that defines the orifice may be used to facilitate guiding button 825 into the orifice during expansion. Slot 830 is shown in FIG. 9 with a wider end, narrowing as it nears orifice 826. This wider end facilitates initial capture of the button when the first limb is passed under the second limb to load the rib, as discussed above.

In operation, rib 800 may be deployed by first disposing the loaded hose anti-collapse rib within a hose subject to vacuum. Then the opposite curved cantilevered portions of the rib are expanded to form the rib into the generally circular shape in contact with an inner surface of the hose. Raised button 825 defined by one of the tabs is indexed in button receptive orifice 826 defined in the other tab to lock hose anti-collapse rib 800 in the preferred generally circular shape. As noted, the expansion of rib 800 might be facilitated by sliding raised button 825 in slot 830 to guide button 825 into orifice 826. FIG. 8 illustrates button 825 as defined at the end of tab 816. However, the button may, in accordance with the present invention, be defined at other positions along a tab.

Figure 10:
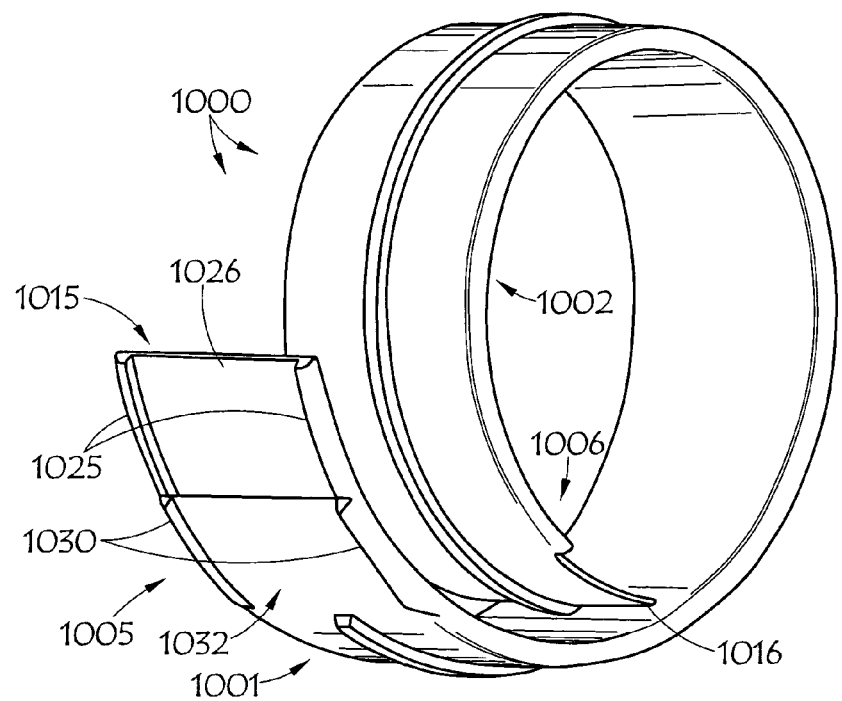
FIG. 10 is a perspective view of an embodiment of the present hose anti-collapse rib having a raised edge locking mechanism.
Figure 11:
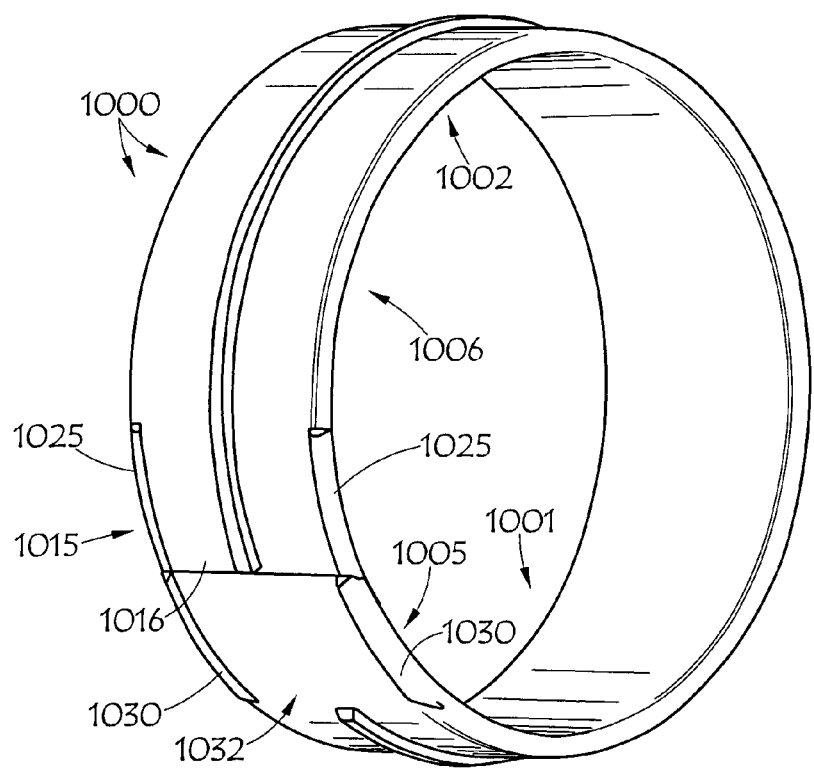
FIG. 11 is a perspective view of the embodiment of FIG. 10 with the rib expanded.

FIG. 10 is a perspective view of embodiment 1000 of the present hose anti-collapse rib having a raised edge locking mechanism. FIG. 11 is a perspective view of the embodiment of FIG. 10 with rib 1000 expanded. Hose anti-collapse rib 1000 might include first cantilevered portion or limb 1001 curved in a first direction and defining first end 1005 and second cantilevered portion or limb 1002 curved with a different curvature than first cantilevered portion 1001 and in a direction facing the first direction. Limb 1002 preferably defines second end 1006 disposed at an opposite extent of rib 1000 from first end 1005. Embodiment 1000 might have complementary tabs 1015 and 1016 defined by ends 1005 and 1006, respectively. In this embodiment raised edges 1025 are defined along the outside edges of one of the tabs (tab 1015 in FIGS. 10 and 11), defining channel 1026 therebetween. The other tab (tab 1016 in FIGS. 10 and 11) has a complementary width which will fit into channel 1026 when first end 1005 is locked to second end 1006 to form a generally circular-shaped rib, as shown in FIG. 11. The raised edges may be extended beyond first tab 101, such as shown in FIGS. 10 and 11 to provide extended raised edges 1030, defining extended channel 1032.

In operation, rib 1000 may be deployed by disposing a loaded rib within a hose subject to vacuum and expanding the opposite curved cantilevered portions 1001 and 1002 of rib 1000, to form the rib into a generally circular shape in contact with an inner surface of the hose. Narrower tab 1016 may be slid between extended raised edges 1030 during expansion, guiding narrow tab 1016 into locking channel 1026 defined between raised edges 1025. As shown in FIG. 11, raised edges 1025, defined along outside edges of one of the tabs, are indexed with the other tab, locking hose anti-collapse rib 1000 in the preferred generally circular shape.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A hose anti-collapse rib comprising:
   a first cantilevered portion curved in a first direction and defining a first end;
   a second cantilevered portion curved with a different curvature than said first cantilevered portion and in a direction facing said first direction and defining a second end disposed at an opposite extent of said rib from said first end;
   interlockable complementary tabs defined by said ends with a raised locking button defined by one of said tabs and a complementary button receptive orifice defined in the other of said tabs, said button received in said orifice, locking said first end to said second end such that said first and second cantilevered portions together form a generally circular shape; and
   an interference ridge defined in an exterior surface of said cantilevered portions, said interference ridge is adapted to deform a hose in which said rib is disposed to provide an interference interlock that prevents movement between said rib and said hose when said rib is expanded within said hose;
   wherein in a relaxed state in which said tabs are not interlocked, said first cantilevered portion has less curvature than said second cantilevered portion and said rib defines a non-circular spiral.

2. The rib of claim 1, further comprising a slot defined in a surface of said other of said tabs, adapted to receive and guide said button into said orifice during expansion.

3. The rib of claim 1, wherein each of said tabs is an end portion of said respective cantilevered portion and each of said tabs has a thickness approximately one-half the thickness of said respective cantilevered portion and said tab defined by said first cantilevered portion is generally aligned with an outer portion of said first cantilevered portion and said tab defined by said second cantilevered portion is generally aligned with an inner portion of said second cantilevered portion.

4. The rib of claim 1, wherein one of said tabs comprise a leading edge and another of said tabs comprises a complementary leading edge receptive notch.

5. A method comprising:
   disposing a hose anti-collapse rib within a generally flexible hose subject to vacuum;
   expanding opposite curved cantilevered portions of said rib to form said rib into a generally circular shape in contact with an inner surface of said hose, with complementary tabs defined by the opposite ends of said cantilevered portions;
   indexing a raised button defined by one of said tabs in a button receptive orifice defined in the other of said tabs to lock said hose anti-collapse rib in said generally circular shape; and
   preventing movement of said rib within said hose by engaging an interior surface of said hose with an interference ridge defined in an outer surface of said rib
   wherein in a relaxed state in which said button is not indexed in said orifice, said first cantilevered portion has less curvature than said second cantilevered portion and said rib defines a non-circular spiral.

6. The method of claim 5, wherein said expanding further comprises sliding said raised button in a slot defined in a surface of the other of said cantilevered portions, guiding said button into said orifice defined in said other tab.

7. The method of claim 5 further comprising:
   preventing movement of said rib within said hose by adhering an exterior surface of said rib to an interior surface of said hose.

8. A hose anti-collapse rib comprising:
   a first cantilevered portion curved in a first direction and defining a first end;
   a second cantilevered portion curved with a different curvature than said first cantilevered portion and in a direction facing said first direction and defining a second end disposed at an opposite extent of said rib from said first end;
   interlockable complementary tabs defined by said ends with a raised edge defined along each outside edge of one of said tabs, defining a channel between said raised edges, and the other of said tabs having a complementary width fitting into said channel when said first end is locked to said second end such that said first and second cantilevered portions together form a generally circular shape, and
   an interference ridge defined in an exterior surface of said cantilevered portions, said interference ridge is adapted to deform a hose in which said rib is disposed to provide an interference interlock that prevents movement between said rib and said hose when said rib is expanded within said hose
   wherein in a relaxed state in which said tabs are not interlocked, said first cantilevered portion has less curvature than said second cantilevered portion and said rib defines a non-circular spiral.

9. The rib of claim 8, wherein said raised edges extend beyond the tab by which they are defined further onto the respective cantilevered portion.

10. The rib of claim 8, wherein each of said tabs is an end portion of said respective cantilevered portion and each of said tabs has a thickness approximately one-half the thickness of said respective cantilevered portion and said tab defined by said first cantilevered portion is generally aligned with an outer portion of said first cantilevered portion and said tab defined by said second cantilevered portion is generally aligned with an inner portion of said second cantilevered portion.

11. The rib of claim 8, wherein one of said tabs comprise a leading edge and another of said tabs comprises a complementary leading edge receptive notch.

12. A method comprising:

disposing a hose anti-collapse rib within a generally flexible hose subject to vacuum;

expanding opposite curved cantilevered portions of said rib to form said rib into a generally circular shape in contact with an inner surface of said hose with complementary tabs defined by the opposite ends of said curved cantilevered portions;

indexing raised edges defined along outside edges of one of said tabs with the other of said tabs, locking said hose anti-collapse rib in said generally circular shape; and preventing movement of said rib within said hose by engaging an interior surface of said hose with an interference ridge defined in an outer surface of said rib wherein in a relaxed state in which said tabs are not locked, said first cantilevered portion has less curvature than said second cantilevered portion and said rib defines a non-circular spiral.

13. The method of claim 12, wherein said expanding further comprises sliding said other of said tabs between said raised edges, guiding said other tab into a channel defined in said one tab, between said raised edges.

14. The method of claim 12 wherein said locking comprises:

engaging a leading edge on one of said tabs with a complementary leading-edge-receptive notch on another of said tabs.

15. The method of claim 12 further comprising:

preventing movement of said rib within said hose by adhering an exterior surface of said rib to an interior surface of said hose.

* * * * *